United States Patent [19]

Poth

[11] Patent Number: 5,185,497
[45] Date of Patent: Feb. 9, 1993

[54] SINGLE-POLE GAS-INSULATED LINE DUCT

[75] Inventor: Rainer Poth, Bad Vilbel, Fed. Rep. of Germany

[73] Assignee: Siemens Aktiengesellschaft, Berlin & Munich, Fed. Rep. of Germany

[21] Appl. No.: 783,852

[22] Filed: Oct. 29, 1991

[30] Foreign Application Priority Data

Oct. 30, 1990 [DE] Fed. Rep. of Germany ....... 4034733

[51] Int. Cl.⁵ .......................................... H02G 15/24
[52] U.S. Cl. .................................... 174/21 C; 174/19; 174/21 R; 174/21 JS; 174/24; 174/28
[58] Field of Search ................. 174/19, 21 R, 21 JS, 174/21 C, 24, 28, 27

[56] References Cited

U.S. PATENT DOCUMENTS

| | | | |
|---|---|---|---|
| 3,546,356 | 12/1970 | Graybill | 174/21 C |
| 3,652,778 | 3/1972 | Sakai | 174/28 |
| 3,800,103 | 3/1974 | Haerdi-Kern et al. | 200/1 |
| 4,316,652 | 2/1982 | Matsuda | 174/27 X |
| 4,338,483 | 7/1982 | Euvrard et al. | 174/21 C X |
| 4,414,424 | 11/1983 | Mizoguchi et al. | 174/28 |
| 4,556,755 | 12/1985 | Bolin et al. | 174/21 C |
| 4,591,655 | 5/1986 | Czech et al. | 174/21 C X |

FOREIGN PATENT DOCUMENTS

| | | |
|---|---|---|
| 2165389 | 8/1980 | Fed. Rep. of Germany . |
| 8512872 | 9/1985 | Fed. Rep. of Germany . |
| 31425 | 9/1971 | Japan ................. 174/21 C |

Primary Examiner—Morris H. Nimmo
Attorney, Agent, or Firm—Kenyon & Kenyon

[57] ABSTRACT

A single-pole gas-insulated line duct has a enclosing tube and an inner conductor held centered in place in the enclosing tube by support insulators. Electrode bodies embedded in arms of the support insulators engage either in a slot between flanges of sections of the enclosing tube or lie against the inside wall of the sections with a spring-action contact member. Locking members connect the support insulators and sections of the inner conductor. Coupling members can be introduced into abutting sections of the inner conductor and demonstrate mutli-surface sliding contact elements.

5 Claims, 4 Drawing Sheets

SINGLE-POLE GAS-INSULATED LINE DUCT

BACKGROUND OF THE INVENTION

The present invention relates generally to single-pole gas-insulated line ducts, and more particularly to a single-pole gas-insulated line duct with an enclosing tube and a tubular inner conductor held centered in place in the enclosing tube by support insulators, where the enclosing tube is divided into sections provided with flanges, and the inner conductor is also subdivided into sections connected together both mechanically and electrically.

DE-U-85 12 872 discloses this type of a single-pole gas-insulated line duct. Such an object can also be called a gas-insulated and single-phase metal-enclosed tubular gas-filled cable or also a gas-insulated busbar or tubular busbar. These ducts are used in applications having relatively short links between parts of a gas-insulated medium-voltage or high-voltage switching system erected at a mutual distance from one another, or between such a switching system and an associated transformer. The use of a line duct of the type indicated appears advantageous in comparison with the use of a high-voltage cable, in that a conventional cable requires bushings, the outer part of which is relatively long in regard to the lower insulation resistance of air. If the gas generally used for insulation of the plant sections, e.g. sulfur hexafluoride, is used this restriction does not apply, and short bushings of the known disk-shaped or star-shaped design are sufficient.

Since the structural design of the installation site of a switching system of the type mentioned can vary from case to case, it can be difficult to insert the line duct between the plant sections because the line duct is rigid in comparison with a cable.

The present invention is directed to the problem of developing components of a line duct from which the required gas-insulated link needed can be assembled in the simplest manner possible.

SUMMARY OF THE INVENTION

The present invention solves this problem by providing support insulators that have radially projecting arms with rounded electrode bodies embedded in them. The support insulators have a metal sleeve on their inside circumference. The metal sleeve has at least one opening for engaging a locking member attached to the tubular inner conductor. The electrode bodies are designed to be extended over the circumference of the arms of a support insulator in order to be held in a slot formed between two abutting flanges of sections of the metal tube. Furthermore, the electrode bodies are arranged approximately flush with the circumferential surface of the arms of a support insulator, and provided with a spring-action projecting contact member, for use in the area between the flanges of a segment of the enclosing tube.

Thus, two different embodiments of support insulators are available, which differ only in regard to the electrode bodies. This makes it possible to produce sections of a line duct with any desired length. For example, if short sections of a line duct are required, then it is sufficient to support the inner conductor in the area of the abutting flanges of the sections of the enclosing tube. For longer sections of enclosing tubes, the support insulators provided with spring-action contact members can be used. The electrode bodies in the arms of the support insulators are reliably activated by the contact established with the inner wall of the enclosing tube. The inner conductor is axially fixed in the simplest manner relative to the support insulators, by means of self-activating locking members. A line duct according to the present invention can therefore be assembled on site, from available components—sections of enclosing tube with flanges, tubular inner conductors and two types of support insulators—like a construction kit.

A reliable current transfer can be ensured, in spite of the occurrence of thermal expansions, by the fact that a multiple-surface sliding contact element is arranged in at least one slot allocated to each section, of a coupling member. This coupling member can be introduced into the sections, for an electrically conductive connection of two abutting sections of the inner conductor. Such sliding contact elements already exist in a number of different devices and therefore do not require a more detailed explanation.

The locking member can be arranged to spring radially outwards and protrude into the interior of the inner conductor, where the coupling member has a recess for the part of the locking member which projects towards the inside. In this manner, the coupling member is fixed relative to the inner conductor. The latter is fixed relative to the support insulator. Since it is sufficient if one section of the inner conductor is secured against axial displacement at one point, the advantage achieved is that length changes, i.e. thermal expansion, resulting from heating due to the operating current can be accommodated without hindrance. Therefore, the sections of the inner conductor can be sized in such a way that a suitable interstice for taking up thermal expansion remains.

The design features of a line duct of the type specified, as explained above, therefore permit straight connections between plant parts. Occasionally, however, the task arises to connect connection points with one another which are offset relative to one another. According to a further development of the present invention, sections of the enclosing tube and the inner conductor which are at right angles to one another can also be connected, by means of an enclosing tube corner member, i.e. a coupling corner member. The coupling corner member is connected with the sections of the inner conductor to be connected via multiple-surface slide contact elements, and is held centered via a support insulator. In this manner, unhindered heat expansion is also ensured in the area of the right-angle deflection.

The coupling corner member for the sections of the inner conductor can consist of two parts connected at right angles, where an inner conductor replacement member is inserted in the support insulator, between its metal sleeve and the part, to hold the one part. This needs to have approximately the axial length of the metal sleeve, or can be slightly longer and have rounded edges.

DETAILED DESCRIPTION

Figure 1:
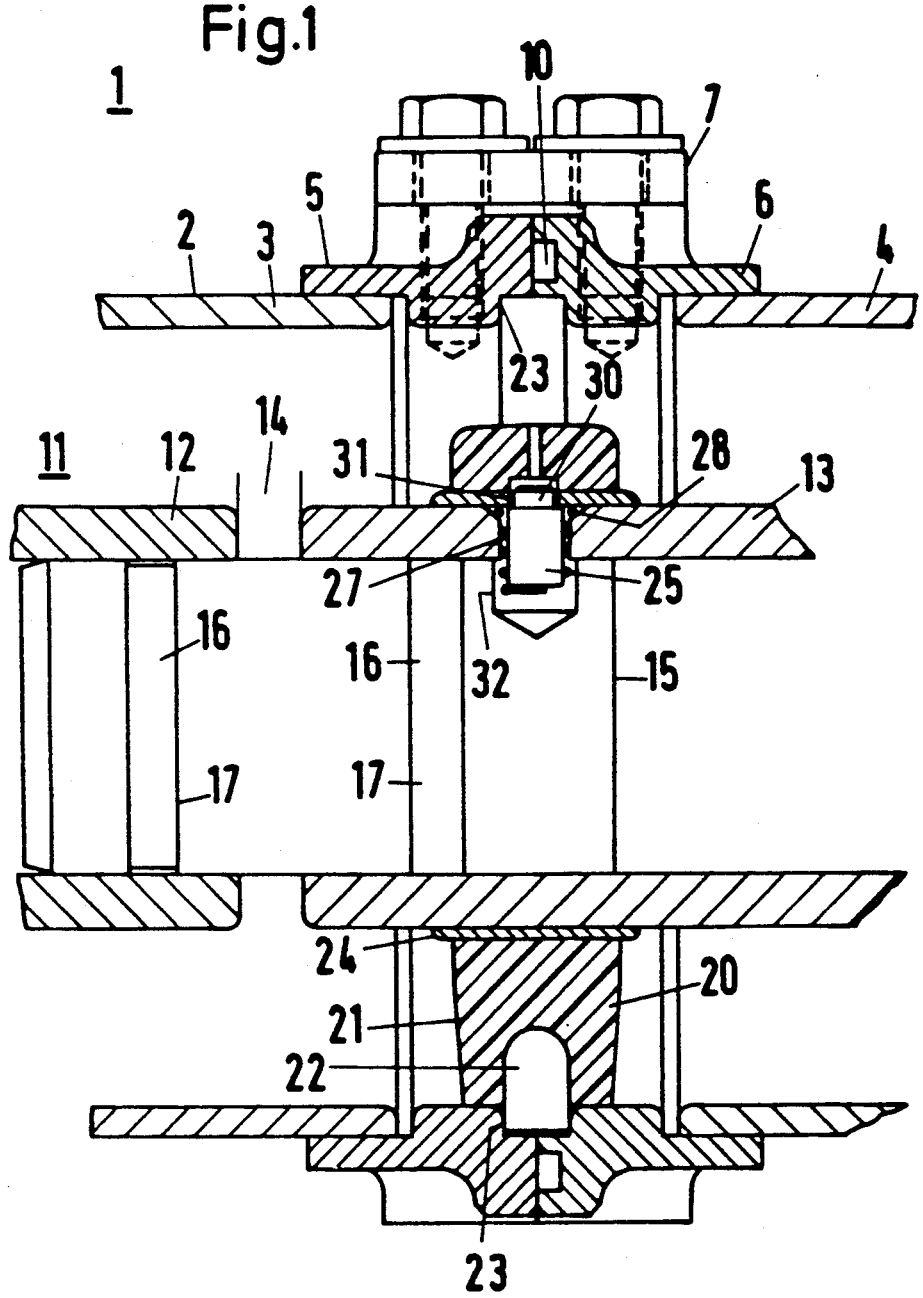
FIG. 1 shows a longitudinal cross-section of two abutting sections of a enclosing tube and an inner conductor.

Referring to FIG. 1, a metal-enclosed gas-insulated line duct 1 has an enclosing tube 2. The enclosing tube 2 is divided into several sections, of which two sections 3 and 4 are shown in FIG. 1. The ends of the sections 3 and 4 are each provided with a flange 5 and 6, respectively. A line link 7 ensures a low-resistance electrical connection between the sections 3 and 4. A O-ring seal 10 inserted into a slot of the flange 6 permits a gas-tight seal of the sections 3 and 4.

The line duct 1 furthermore has an inner conductor 11, which is also divided into sections. The inner conductor 11 is tubular in structure, with an axial distance 14 existing between the sections 12 and 13, which accommodates thermal expansion, thus permitting unhindered relative displacement of the sections 12 and 13 when heating takes place. A coupling member 15, which has two multiple-surface sliding contact elements 16 on its circumference, serves for the electrical conductive connection of the sections 12 and 13. This can be any desired suitable contact element, e.g. an element as disclosed in FIG. 4 of DE-B-21- 65 389 on an enlarged scale. By being held in a slot 17, the sliding contact elements 16 are secured against lateral displacement.

To support the inner conductor 11 relative to the enclosing tube 2, a support insulator 20 is provided. This support insulator can be produced from an insulating plastic. As is evident in greater detail particularly from FIG. 2, the support insulator 20 has three arms 21, the circumference of which is adapted to the inside diameter of the enclosing tube 2, i.e. the sections 3 and 4. In each of the arms 21, an electrode body 22 is molded in, or attached in some other manner, with the end facing towards the center of the arrangement being rounded off, to produce a more uniform electrical field. On the outside, the electrode body 22 projects out beyond the circumference of its arm 21, and projects with this protruding part into a slot 23. This slot is formed by corresponding recesses of the abutting flanges 5 and 6. The support insulator 20 is thus fixed axially relative to the sections 3 and 4 of the enclosing tube 2, and is dielectrically discharged by means of electrically conductive connections of the electrode bodies 22, by being wedged between the flanges 5 and 6.

At its inner circumference, the support insulator 20 has a metal sleeve 24. The inside diameter of the metal sleeve 24 matches the outside diameters of the sections 12 and 13 of the inner conductor 11.

Figure 2:
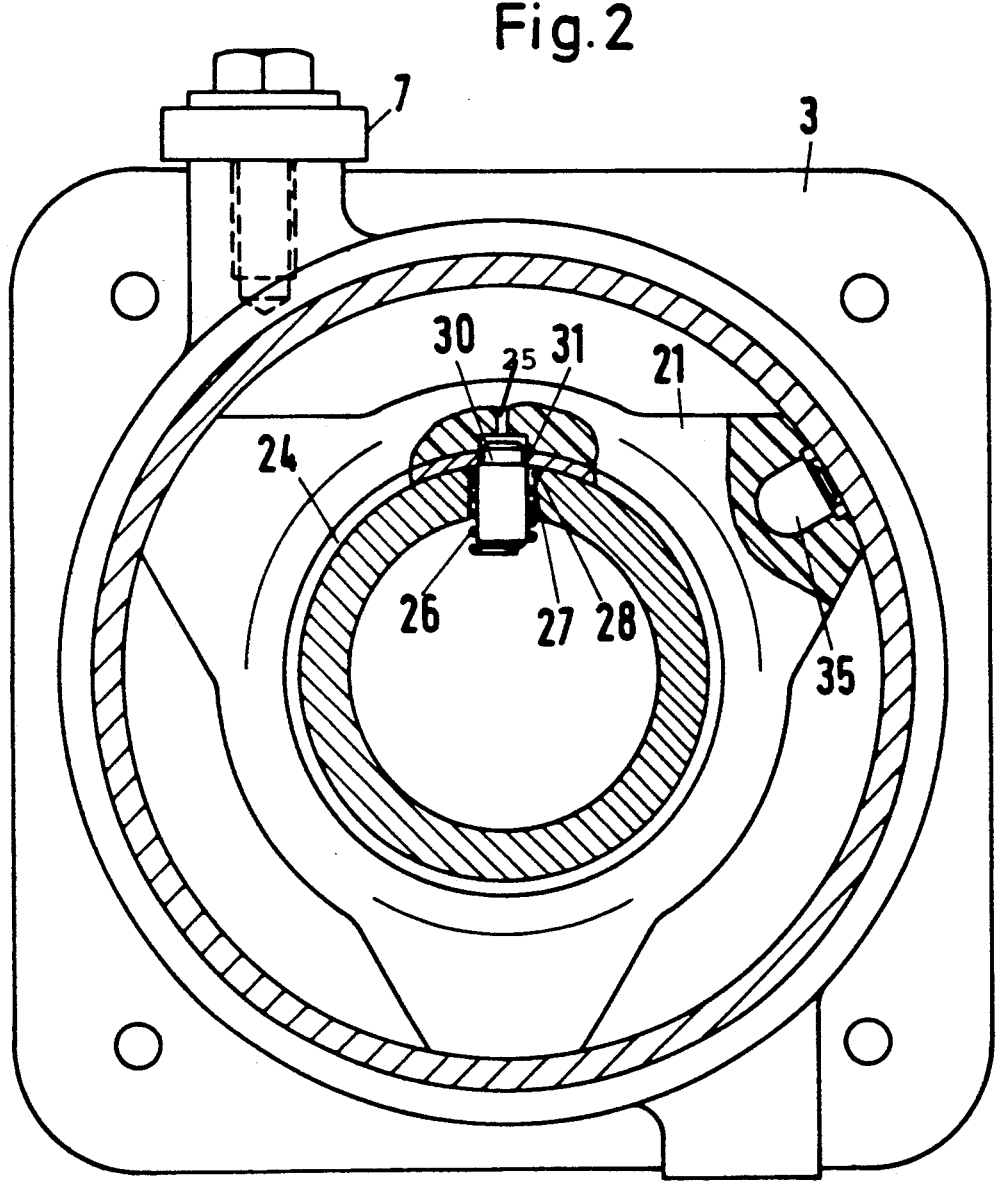
FIG. 2 depicts a cross-section through a section of a enclosing tube and an inner conductor as well as a partial cross-section of a support insulator.

Near its end, the segment 13 of the inner conductor 11 is provided with a locking member 25. The locking member 25 has a pin shape or bolt shape, and is under the action of a helical spring 26. The helical spring 26 is supported with a turn with a widened diameter in a conical of an opening 27 on the circumference of the section 13 and which rests with a bent-away end leg against the inner end of the locking member 25 at the opposite end, as shown in FIG. 2. This locking member 25 is pressed radially outward under the effect of the helical spring 26. As is evident in FIGS. 1 and 2, a tab 30 of the locking member 25 which projects beyond the circumference of the section 13 engages in an opening 31 of the metal sleeve 24. In this way, the section 13 is secured against axial displacement relative to the support insulators 20. Furthermore, the coupling member 15 possesses a recess 32 (shown in FIG. 1), into which the end of the locking member 25 opposite the tab 30 engages. In this manner, the coupling member 15 is also prevented from axial displacement relative to the section 13.

Figure 3:
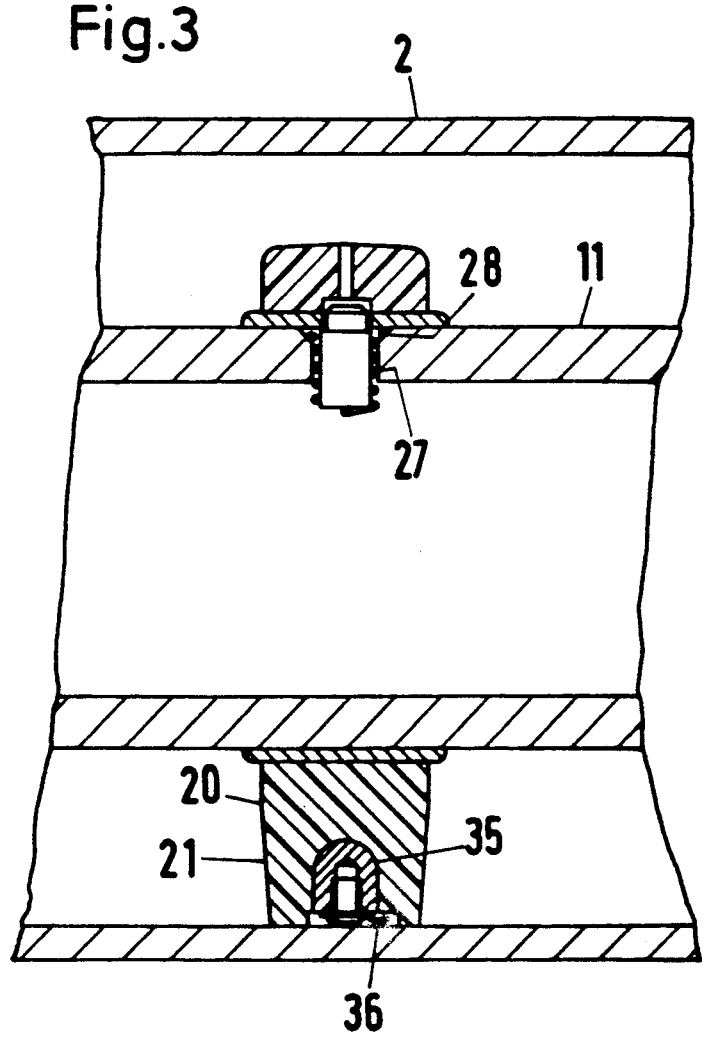
FIG. 3 shows a longitudinal cross-section through the parts of FIG. 2.

For sections of the enclosing tube 2 which do not exceed a certain length, it can be sufficient to support the related segment of the inner conductor 11 only in the area of the flange, i.e., near the ends of the related section of the enclosing tube 2, as shown in FIG. 1. However, if longer sections are required, additional support for the inner conductor at one or more additional points relative to the section of the enclosing tube 2 is necessary. The support insulators 20 are basically also suitable for this purpose. It is merely recommended to use the shortened electrode body 35 shown in FIGS. 2 and 3 rather than the electrode body 22 shown in FIG. 1, which shortened electrode body does not project beyond the circumference surface of the arms 21 of the support insulator 20. However, a spring-action and radially projecting contact member 36 is provided in FIG. 3 and ensures contact between the enclosing tube and the electrode body 35 when the support insulator 20 is introduced into the segment of the enclosing tube. This guarantees dielectrical discharge of the support insulator 20 during the introduction of the support insulator 20 into the section of the enclosing tube. If the inner conductor is provided with openings 27 conically countersunk on the outside at certain intervals, the support insulators 20 can be axially secured by means of the locking members 25 as described.

The components described above make it possible to produce short and relatively long straight-line connections between components of a medium-voltage or high-voltage switching system. However, if the connection points are offset relative to one another, then a single or multiple right-angle deflection can be achieved by means of the arrangement shown in FIG. 4.

Figure 4:
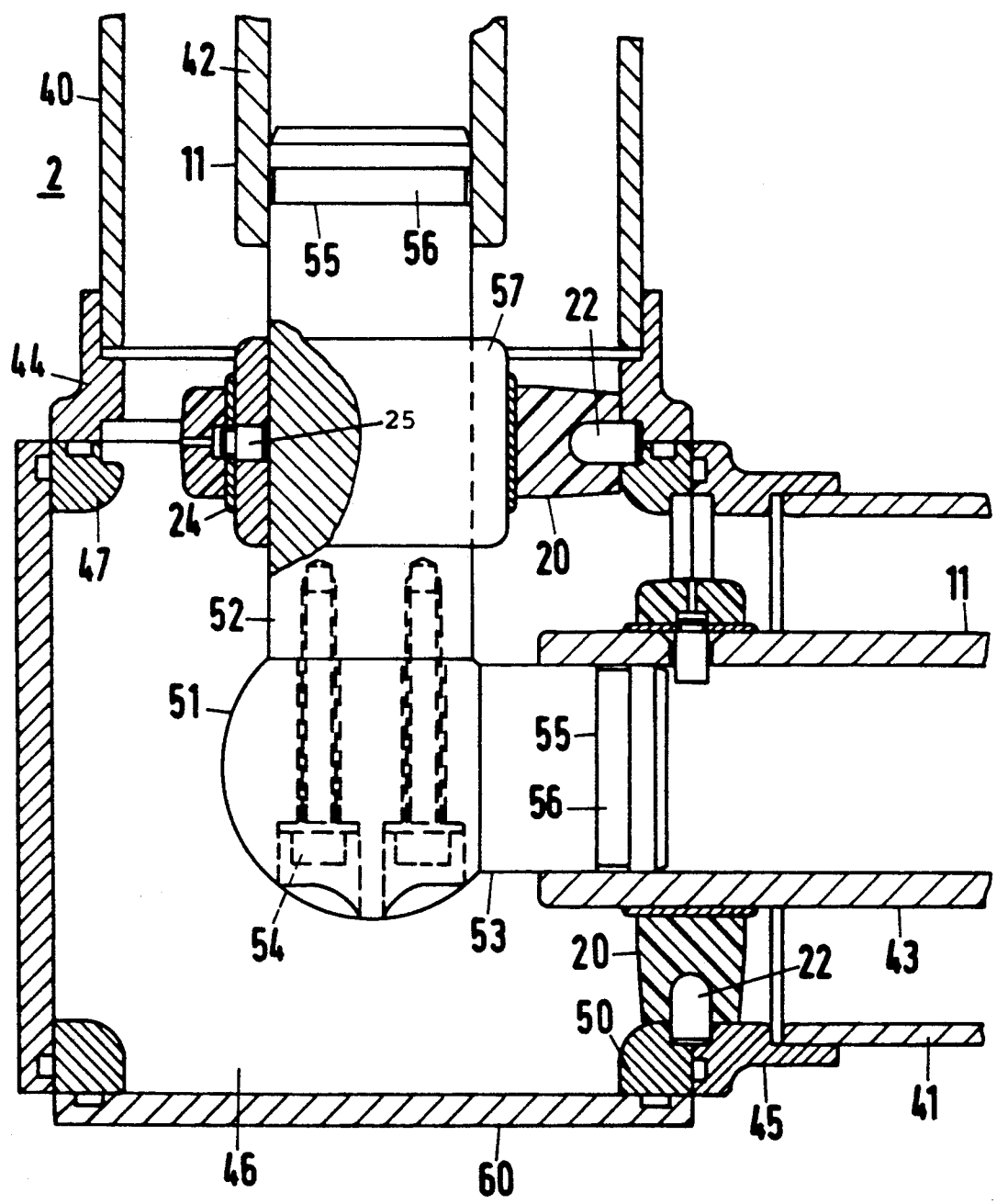
FIG. 4 illustrates a cross section of an arrangement for right-angle connection between two sections of an enclosing tube and an inner conductor.

FIG. 4 shows a section 40 and a section 41 of a enclosing tube, at right angles thereto, as well as a section 42 and a section 43 of an inner conductor, at right angles thereto, which are mechanically and electrically connected with one another. The sections 40 and 41 of the enclosing tube are each provided with a flange 44 and 45, respectively, in the same manner as was explained using FIG. 1. A enclosing tube corner member 46 which also has flanges 47 and 50 is connected with these flanges 44 and 45. Also, analogous to FIG. 1, support insulators 20 are provided in the area of the flanges 44 and 47 as well as 45 and 50. The electrode bodies 22 of the support insulators 20 are held in recesses or slots between the above mentioned flanges.

A coupling corner member 51, which is composed of two parts 52 and 53 connected at right angles by means of screws 54, serves to connect the sections 42 and 43 of the inner conductor. Each of the parts 52 and 53 is provided with a slot 55 to hold a multi-surface sliding contact element 56 of the type already mentioned. In the arrangement according to FIG. 4, the segment 42 of the inner conductor ends above the support insulator 20 inserted between the flange 44 and 47. An inner conductor replacement member 57 is used to ensure that the part 52 of the coupling corner member 51 still has the required mechanical support in the support insulator 20. A locking member 25 ensures mutual axial securing between the part 52, the inner conductor replacement member 57 and the support insulator 20, in the manner already described. The enclosing tube corner member 46 can be structured in such a way that free access from the outside exists, at least in the direction of the screws 54, after removal of a closing cover 60.

As the above description shows, a line duct can be assembled from the components described with little assembly effort like a construction kit. Sections of the enclosing tube, sections of the inner conductor, bushings and coupling members form the major parts of this kit. When two sections of the enclosing tube are put together, a support insulator is installed at the same time. A related segment of the inner conductor can be pushed through the metal sleeve of the support insulator, until the locking member 25 locks into place. With this, a coupling member is attached at the same time. The next segment of the inner conductor is merely pushed onto the end of the coupling member and is mechanically centered and electrically connected via the sliding contact elements.

What is claimed is:

1. A single-pole gas-insulated line duct, comprising:
   a) a enclosing tube divided into a plurality of tubular sections, wherein each tubular section has a flange;
   b) a support insulator including:
      (i) a radially projecting arm with an embedded rounded-off electrode body;
      (ii) an inner circumference; and
      (iii) a metal sleeve being disposed at said inner circumference,
      and having an opening;
   c) a tubular inner conductor being held centered in place in said enclosing tube by the support insulator, being divided into a plurality of conductor sections electrically and mechanically connected with each other, and having a locking member attached at the tubular inner conductor and engaging said opening;
   d) a slot formed between two abutting flanges of the plurality of tubular sections, wherein the electrode body extends beyond the radially projecting arm and the electrode body is held in said slot; and
   e) an additional electrode body for use in an area between flanges of tubular sections disposed approximately flush with a circumferential surface of the radially projecting arm, and having a spring-action projecting contact member.

2. The line duct according to claim 1, further comprising:
   a) a slot disposed in each conductor section;
   b) a coupling member having a slot, wherein said coupling member can be introduced into the conductor section; and
   c) a first multi-surface sliding contact element disposed in the slot of a coupling member, thus forming an electrically conductive connection between two abutting conductor sections.

3. The line duct according to claim 2, wherein said locking member has spring action radially outward and is disposed projecting into the interior of the inner tubular conductor, and wherein said coupling member further comprises a recess receiving said locking member.

4. The line duct according to claim 3, further comprising:
   a) an enclosing tube corner member connecting tubular sections and the inner conductor at right angles to one another; and
   b) a second multi-surface sliding contact element, wherein the enclosing tube corner member is connected with the conductor sections via said first and second multi-surface sliding contact element and is held centered via said support insulator.

5. The line duct according to claim 4, wherein said enclosing tube corner member comprises a first and second part connected together at right angles, and further comprising an inner conductor replacement member inserted in the support insulator between the metal sleeve and the first part holding the first part.

* * * * *